(12) United States Patent
Ota et al.

(10) Patent No.: US 8,045,020 B2
(45) Date of Patent: Oct. 25, 2011

(54) IMAGING APPARATUS HAVING SPECIFIC MODE SWITCHING SEQUENCE AND HARD DISK DRIVE APPEARANCE TO EXTERNALLY-CONNECTED DEVICES

(75) Inventors: Masataka Ota, Fujisawa (JP); Masahiro Fujimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 573 days.

(21) Appl. No.: 11/626,435

(22) Filed: Jan. 24, 2007

(65) Prior Publication Data
US 2007/0296832 A1 Dec. 27, 2007

(30) Foreign Application Priority Data
Jun. 12, 2006 (JP) .................................. 2006-161785

(51) Int. Cl.
*H04N 5/76* (2006.01)
(52) U.S. Cl. ...................................... 348/231.8
(58) Field of Classification Search ............... 348/231.8, 348/231.9, 373–376, 220.1
See application file for complete search history.

(56) References Cited

U.S. PATENT DOCUMENTS

| | | | |
|---|---|---|---|
| 2004/0189809 A1* | 9/2004 | Choi | 348/207.1 |
| 2004/0201746 A1* | 10/2004 | Ikehata et al. | 348/231.8 |
| 2004/0263652 A1* | 12/2004 | Oda | 348/272 |
| 2005/0286859 A1* | 12/2005 | Komi et al. | 386/46 |
| 2006/0023083 A1* | 2/2006 | Yoo | 348/231.99 |

FOREIGN PATENT DOCUMENTS

| | | |
|---|---|---|
| JP | 05-137147 | 6/1993 |
| JP | 06-006651 | 1/1994 |
| JP | 10-093918 | 4/1998 |
| JP | 2004235679 A * | 8/2004 |
| JP | 2006-093950 | 4/2006 |

OTHER PUBLICATIONS

Machine Translation of JP 2004-235679, Aug. 2004.*

* cited by examiner

*Primary Examiner* — David Ometz
*Assistant Examiner* — Dillon Durnford Geszvain
(74) *Attorney, Agent, or Firm* — Antonelli, Terry, Stout & Kraus, LLP

(57) ABSTRACT

An imaging apparatus, comprising: a first recording module, which has a first initialization time from initialization to coming into a recordable condition; a second recording module which has a second initialization time from initialization to coming into a recordable condition, being longer than the first initialization time; a mode switching module, which is configure to switch over a power OFF mode, a mode for recording into the first recording module, and a mode for recording into the second recording module, wherein the mode exchange switch, which is configured to exchange the mode in an order from the power OFF mode to the mode for recording into the first recording module, and to the mode for recording into the second recording module, whereby shortening an apparent initializations time of the recording module having a long initialization time, while using a high-speed initialization characteristic of the recording module having a short initialization time effectively, thereby obtaining an improvement on the operability for a user.

11 Claims, 8 Drawing Sheets

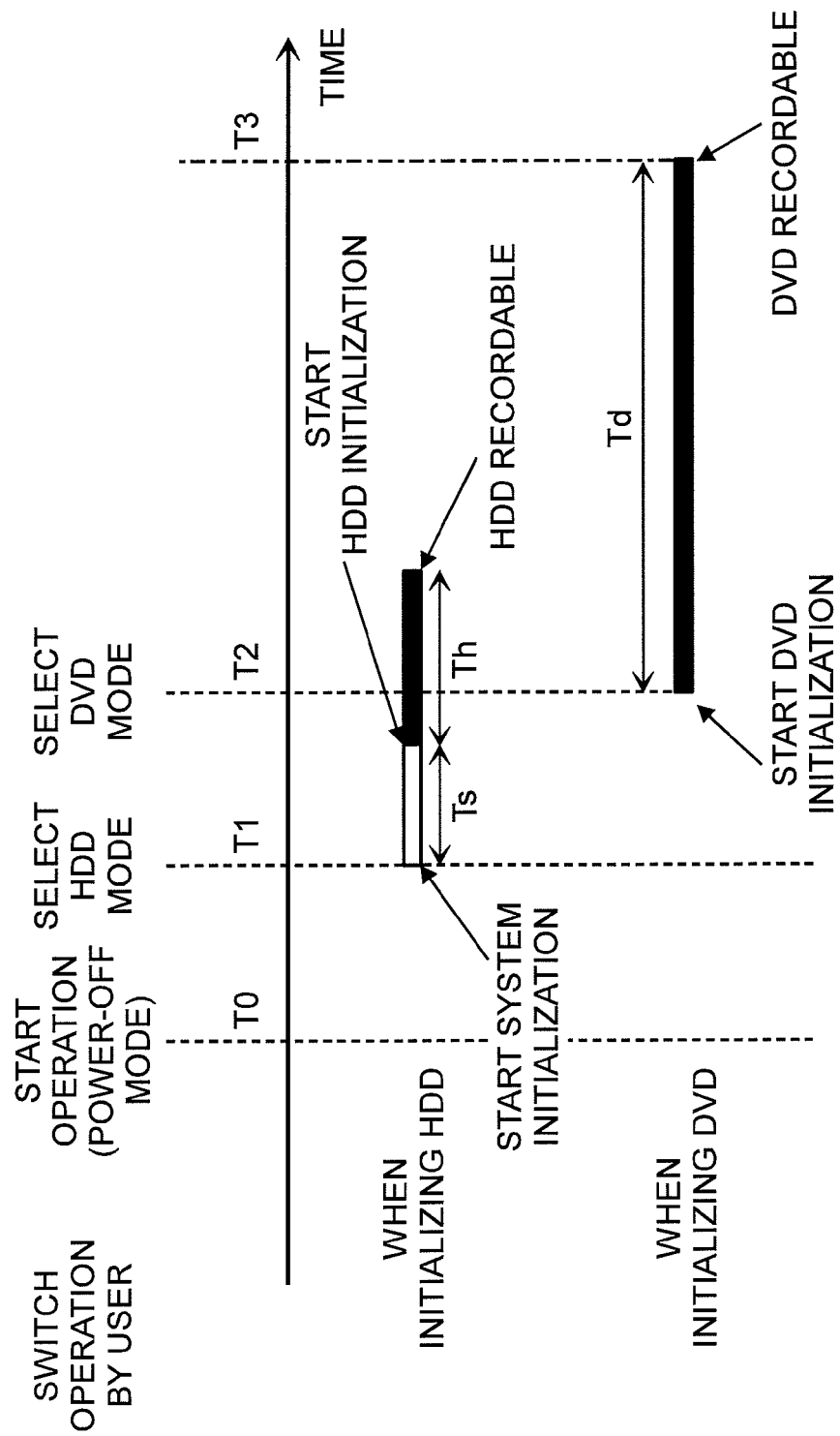

FIG.9

| MODE TYPE | FUNCTION WHEN MAKING SEMI-PUSHDOWN ON SHUTTER BUTTON | FUNCTION WHEN MAKING FULL-PUSHDOWN ON SHUTTER BUTTON | CONTROL WHEN MAKING SEMI-PUSHDOWN ON SHUTTER BUTTON | CONTROL WHEN MAKING FULL-PUSHDOWN ON SHUTTER BUTTON |
|---|---|---|---|---|
| RECORDING MODE | FOCUS LOCK | SHUTTER | FOCUS LOCK EFFECTIVE | SHUTTER EFFECTIVE |
| REPRODUCING MODE | STILL PICTURE CAPTURE | STILL PICTURE CAPTURE | STILL PICTURE CAPTURE EFFECTIVE | NEGLECT WHEN FULL-PUSHDOWN IS MADE AFTER SEMI-PUSHDOWN WITHOUT RELEASING SEMI-PUSHDOWN. OTHER THAN THAT, STILL PICTURE CAPTURE IS EFFECTIVE. |
| NAVIGATION MODE | SELECT | SELECT | SELECT EFFECTIVE | NEGLECT WHEN FULL-PUSHDOWN IS MADE AFTER SEMI-PUSHDOWN WITHOUT RELEASING SEMI-PUSHDOWN. OTHER THAN THAT, SELECT IS EFFECTIVE. |

IMAGING APPARATUS HAVING SPECIFIC MODE SWITCHING SEQUENCE AND HARD DISK DRIVE APPEARANCE TO EXTERNALLY-CONNECTED DEVICES

BACKGROUND OF THE INVENTION

The present invention relates to an imaging apparatus, and in particular, it relates to an operating portion of the imaging apparatus.

In relation to a switch for starting or initializing a came, as being an operating portion of the imaging apparatus, for example, in Japanese Patent Laying-Open No. Hei 6-6651 (1994), there is the following description:

"While being provided with a video tape-recorder mode side silk-screen printing 3 and a camera mode side silk-screen printing 5, on a side surface in the thickness direction of a rotating ring-like operation key 1, an electric power switch mark 7 at the position opposite to the silk-screen printing 3 and 5, a reproduction mark 9 for indicating a reproducing portion on a side surface in the thickness direction of the operation key 1, an edit mark for indicating a position switching into an editing function, and a line input/output mark 13 for indicating a position of switching between line input/output, etc., at the position where the silk-screen printing 5 is provided is provided a portrait mode mark 15, a sports mode mark 17 and a shutter mode mark 19, etc., for indicating the rotating portion of the operation key 1 for selectively exchanging to one of modes, i.e., portrait, sports, shutter, on a side surface in the thickness direction of the operation key 1, as well as, an automatic operation mode mark 21."

Also, relating to processes when a camera is started or initialized, in Japanese Patent Laying-Open No. 2006-93950 (2006), there is the following description:

"In a system, having a plural number of units therein, each having the same function, such as, in case where a plural number of cameras are provided, as being imaging means, or when it can install a plural number of media, as being recording means, etc., wherein there is a difference in initialization process time from when an electric power is turned ON until when the system can be utilized, the initialization process is conducted, one by one, from the unit having a short initialization process, while utilizing the unit, which is started in advance, until the initialization is completed upon the unit having a long initialization process time."

[Patent Document 1] Japanese Patent Laying-Open No. Hei 6-6651 (1994); and

[Patent Document 2] Japanese Patent Laying-Open No. 2006-93950 (2006).

BRIEF SUMMARY OF THE INVENTION

In recent years, the number of pixels of an imaging or image pickup element is increasing. Also, photographing with a high-definition television (HD) is expected, having a number of scanning lines being larger than that of the standard (SD) picture quality. With the increase of the pixel number, for this reason, demanding is large for a recording medium having a large memory capacity. On the other hand, demanding is also large for a detachable recording medium, enabling to reproduce it by means of an external equipment, quickly, or enabling to deliver it to a friend, quickly. Then, demanding is also large for a recording apparatus for enabling to utilize the respective advantages thereof, usefully, with coping with a plural number of recording media.

By the way, with each of the recording means for driving the plural number of recording media, there is the respective difference in the initialization time, from the time when starting up to the time when it comes to be recordable. For example, the initializing time is relatively short for a memory card, which applies a semiconductor memory therein. For a magnetic tape recorder, taking a long time for loading operation of a mechanism therein, it takes the initializing time longer than that of the memory card. For a hard disk, taking a time for rotation of a disk, etc., it has the initializing time longer than that of the memory card. Also, for an optical disk drive, since it needs times for operations of distinguishing an optical disk and/or adjustment of laser power, the initializing time thereof comes to be longer than that of the memory card, the tape recorder, or the hard disk.

With a video camera or a digital camera, for reducing electric power consumption for driving by means of a battery, an electric power of the recording means is in the condition of OFF, when it is in the power OFF condition thereof, and therefore, for a user it results into loosing a change to take a picture of an important scene, if the waiting time is long from when operating the electric power ON up to when it enables photographing and recording. For that reason, it is preferable to shorten a waiting time from the time when it is operated with the electric power ON up to when it comes to be recordable.

However, with the switch disclosed in the Patent Document 1, no consideration is made upon recording a moving picture into a plural number of recording media.

Also, with the initializing process shown in the Patent Document 2, assuming that, in case where there are units having the same function thereof, in a plural number thereof, in many cases, the user utilizes them for the purpose of "using which function thereof", but rather "using which unit thereof", therefore the initializing process is executed from the unit, which has a fast initializing time, while using it when that unit comes to be usable, the initializing process is executed on the unit, which has a late initializing time next to the fast one, and thereby achieving the shortening of the time until when the user comes to be utilize the function mentioned above. Explaining by taking an imaging apparatus, for example, it corresponds to an imaging apparatus achieving a function of recording of a moving picture by means of two (2) pieces of units, such as, the magnetic tape and the memory card, for example. Since the user selects the function of recording a moving picture, then recording is made into the memory card having the short initializing time, between the magnetic tape and the memory card, first, and then is made onto the magnetic tape after completing the initializing process of the tape recorder, and thereby reducing or shortening the time until the time when the moving picture can be recorded. However, in case of two (2) recording apparatuses, such as, a hard disk and an optical disk, for example, where a long time recording of the moving picture can be made can on either one of them, it is preferable that the recording is made only on the recording means having a shorter initializing time, however with the conventional technology of this Patent Document 1, there is a problem that the data to be recorded is divided, to be recorded onto the memory card and the magnetic tape, separately.

Also, the camera is the thing to be carried by, i.e., being portable; therefore, it is required to be small in the sizes thereof. Then, with buttons or the like, to be used for conducting the operations while mounting a plural number of recording media thereon, it is impossible to arrange them by the number being same to that of the functions thereof; therefore, a technology is required for operating such the camera, mounting the plural number of recording media thereon and being multi-functional, with practically using the restricted number of buttons, effectively.

Then, for example, according to the present invention, there is provided an imaging apparatus for recording information into a plural number of recording media, comprising an operation portion, for exchanging from a power OFF condition to a recording condition into a first recording medium and to a recording condition into a second recording medium, wherein exchanging to the first recording medium, being shorter in initialization time than that of the second recording medium, is disposed at a position near to an electric power source than the exchanging to the second recording medium.

Also, according to the present invention, for example, there is provided an imaging apparatus, comprising a shutter for detecting a full-pushdown and a semi-pushdown, wherein a mode is exchanged between one for sharing different functions depending on the full-pushdown and the semi-pushdown, and another one of neglecting either one of the full-pushdown or the semi-pushdown when the same function is shared with the full-pushdown and the semi-pushdown, and further when the full-pushdown is made after making the semi-pushdown, but without releasing the semi-pushdown.

With the means mentioned above, an improvement can be obtained in the operability thereof.

Objects, means and effects other than those mentioned above may by made apparent by the embodiments, which will be mentioned later.

BRIEF DESCRIPTION OF THE DRAWINGS

Those and other objects, features and advantages of the present invention will become more apparent from the following description when taken in conjunction with the accompanying drawings wherein:

FIG. 3 shows an example of timing for explaining an initializing time;

FIG. 9 shows an example of functions of a shutter button.

DETAILED DESCRIPTION OF PREFERRED EMBODIMENT

Hereinafter, embodiments according to the present invention will be fully explained by referring to the attached drawings. Although being preferable, in particular, for a video camera, being required to be small in the sizes and dealing with a plural number of recording media therein, however not limited only to this, the present invention is also applicable to other apparatuses than the video camera, each of which has a recording apparatus and an operating portion thereof. Also, the video camera means an apparatus for photographing moving pictures, however not needed to be exclusive use for the moving picture, but it may take a still picture therewith.

Embodiment 1

(1) Structures of Video Camera

Figure 4A:
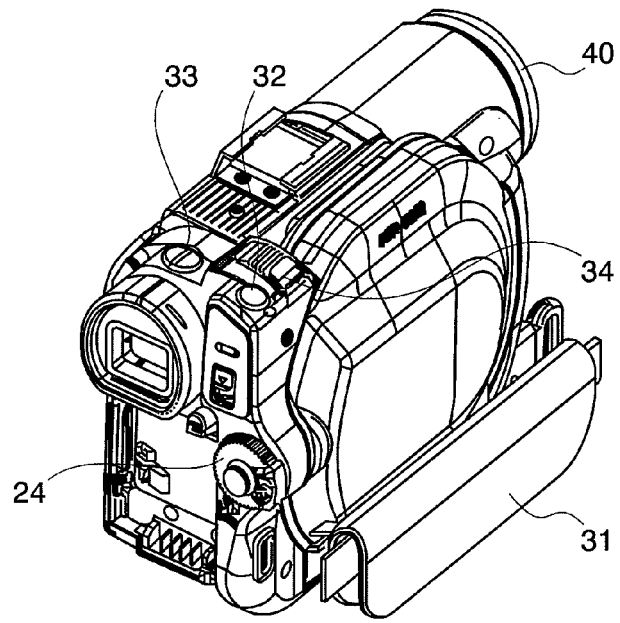
FIGS. 4(a) and 4(b) show an example of outlook (1) of the video camera.
Figure 4B:
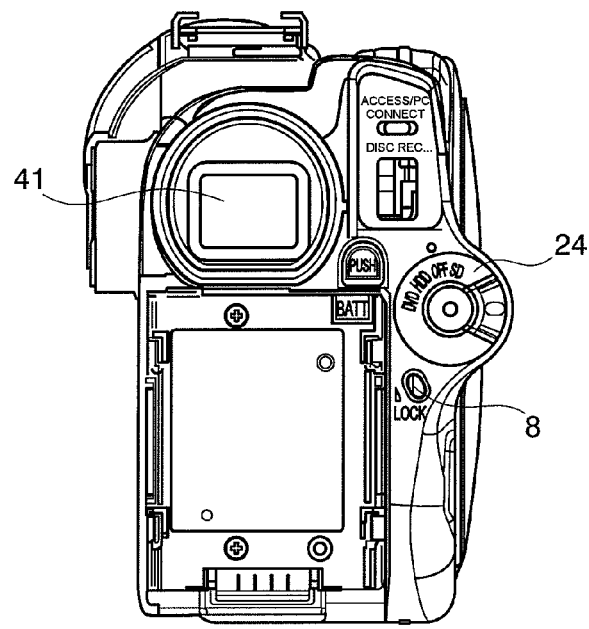
Figure 8:
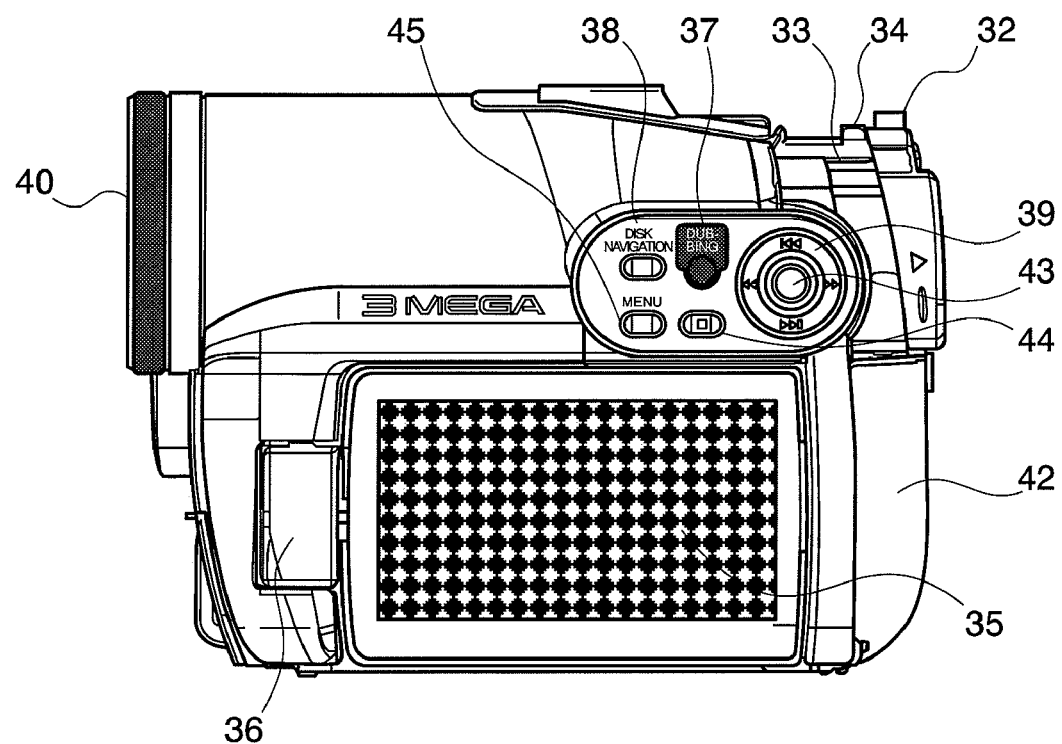
FIG. 8 shows an example of an outlook (2) of the video camera.

FIGS. 4(a) and 4(b) and 8 show an example of outlook of a digital video camera, i.e., being a photographing apparatus. FIG. 4(a) shows a rear perspective view of the video camera, and FIG. 4(b) a rear front view thereof.

On a rear portion (i.e., on a side of a photographer) is arranged a power/mode exchange switch 24 for use of turning ON/OFF of an electric power and exchange the mode thereof. Thus, it is located at such a position that the switch can be operated with a thumb when a user holds the video camera on her/his hand, with passing a hand through a belt 31. Also, a lock switch 8 is provided on a rear portion, to be operable with the thumb, in the similar manner. A shutter button 32 for photographing a still picture, a power-save button 33 for turning the camera into a power saving condition differing from a turning-OFF of an electric power and also for releasing from that power saving condition, and a zoom button 34 for indicating zoom-up and zoom-down of a picture to be photographed are disposed in such the position that a thumb can reach thereto, when a user or an operator holds the camera (i.e., when she/he holds the camera with passing her/his right hand through a belt 31), in particular, when photographing. The shutter button 32 is able to detect the conditions of a full pushdown and a half pushdown, and the function thereof will be mentioned later. A reference numeral 40 depicts a lens for condensing the lights of a target to be photographed. A reference numeral 41 depicts a viewfinder portion for displaying the image or picture, which is signalized on the image pickup element through the lens 40.

FIG. 8 shows a side view of the video camera. There are provided a side-surface display portion 35, such as, of a LCD (Liquid Crystal Display) or the like, and a furculum 36 thereof, wherein the side-surface display portion 35 can be opened/closed and rotated by means of the furculum 36, and also the side-surface display portion 35 can be closed directing to an outside, as is shown in FIG. 8. On the contrary, it can be closed directing to an inside (directing to a reverse side of a paper in FIG. 8), or can be opened so that the side-surface display portion 35 can be seen from the rear thereof, as shown in FIG. 4(a).

A reference numeral 42 depicts a battery, being charged from an AC power source, for supplying the electric power to the video camera. FIG. 4 shows the condition where that battery is removed therefrom.

Also, there are disposed a dubbing button 37 for making an instruction of dubbing from HDD to DVD, a disk navigation button 38 to display a navigation screen, for editing the video files photographed, a cursor button 39 for moving a cursor up and down and right and left, a reproduce button 43 at a central portion of the cursor button 39, for indicating reproduction and/or determination of the picture, a stop button 44 for indicating reproduction and/or deletion of the picture, and a menu button 45 for displaying various kinds of menus on the side-surface display portion 35.

Under the condition where the side-surface display portion 35 is turned to an outside, as is shown in FIG. 8, and when the camera is held on the right hand in FIG. 8, the dubbing button 37, the disk navigation button 38, the cursor button 32, the shutter button 32 and the zoom button 34 can be operated by an index finger and a thumb of the right hand, or they can be operated while seeing the screen; therefore this brings about a preferable or superior usability of the video camera.

Figure 2:
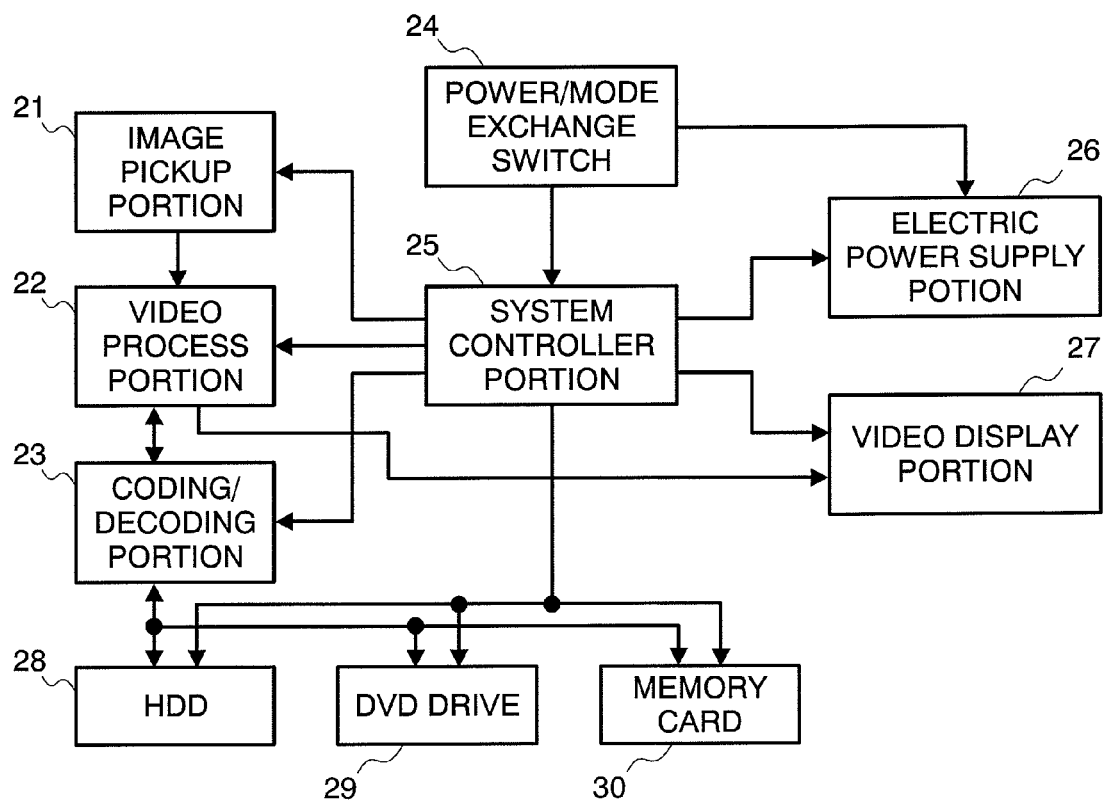
FIG. 2 shows an example of the structures of a digital video camera.

FIG. 2 is a block diagram for showing an example of the structures of the digital video camera.

In an image pickup portion 21 for photographing the picture, a zoom and an iris of lens(es) are controlled by a system controller portion 25, the photographed picture is converted into an electric signal through the image pickup element (a CCD (Charged Coupled Devices) sensor or a CMOS (Complementary Metal Oxide Semiconductor) sensor). And, after being processed with a noise removal and a signal amplification thereon, it is A/D converted into a digital signal.

The digital signal outputted from the image pickup portion 21 is treated with various signal processes, such as, a noise removal, etc., within a video process portion 22, to be a digital video signal. The digital video signal outputted from the video process portion 22 is superposed with character information or the like within the system controller portion 25, and is transmitted to the side-surface display portion 35 and/or the view finder portion (EVF: Electric View Finder), etc., thereby displaying the picture under photographing thereon. Further, an image display portion 27 may be a display, such as, an ELD (Electro Luminance Display), other than a LCD.

Further, the digital video signal outputted from the video process portion 22 is also transmitted to a coding/decoding process portion 23, so as to be compressed and coded, in accordance with a method of MPEG 2 (Moving Picture Experts Group 2), when it is the moving picture, and thereafter, it is recorded in a HDD 28, as a first recording portion, or in a DVD drive 29, as a second recording portion, depending upon a mode selected.

On the other hand, when it is a still picture, it is compressed in accordance with a method of JPEG (Joint Photographic Experts Group), and is recorded into a memory card 30.

In this manner, as the recording portion enabling to record the moving picture, there are provided two (2) drives, i.e., the HDD 28 and the DVD drive 29. Herein, according to the present embodiment, it is possible to drive a disk of 1.8 inch and a memory capacity of 8 GB as the HDD 28, while a DVD disk of 8 cm as the DVD. However, the memory capacity of the 8 cm DVD is about 1.4 GB on a one (1) layer, in the case of the DVD-RAM (Random Access Memory), for example.

The power/mode exchange switch 24 is a portion for turning ON the electric power, and it builds up a switch, having functions of turning ON/OFF of the electric power and of exchanging the mode, for the user to make selection on the recording portion which conducts recording or reproducing. When the power/mode exchange switch 24 is moved from the position of turning OFF the power to the position other than that, the electric power is turned ON, and therefore electric power is supplied from an electric power supply portion 26 to every portion of the present digital video camera. Thereafter, the system controller portion 25 confirms the position of the power/mode exchange switch 24, and it determines the recording portion to be started depending upon the position selected, so as to execute the initialization process under that selected mode. On the other hand, when it is moved to the position of turning the electric power OFF, then after confirming the completion of finishing processes for every portions, the system controller portion 25 sends a control signal of turning the electric power OFF to the electric power supply portion 26; thereby coming into the condition of turning the electric power OFF.

Figure 1:
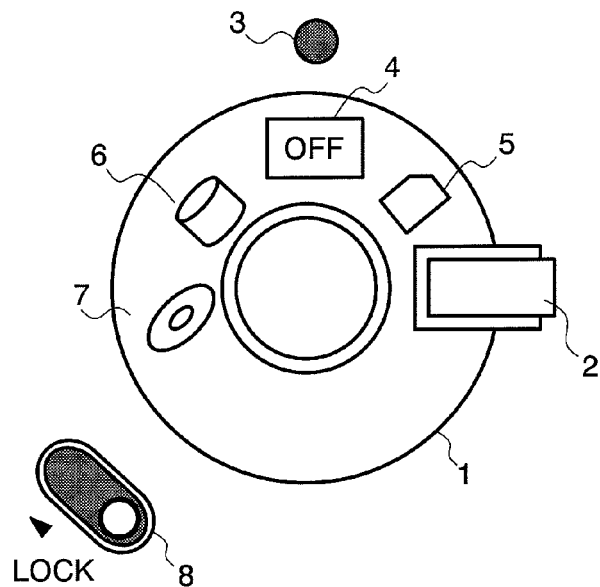
FIG. 1 shows an example of the outlook of a power/mode exchange switch.

FIG. 1 shows the detailed outlook of the power/mode exchange switch 24. The power/mode exchange switch 24 has a form of rotating a disk-like dial portion 1, and is attached with a projection portion 2 for the purpose of an easy operation by the user. Thus, the user can make turning OFF of the electric power and/or selection of the mode of the recording portion. A pattern formed at a portion where a reference mark 3 of the power/mode exchange switch 24, indicating the selected position, comes to the mode indicative of the presently selected recording portion of the digital video camera. In FIG. 1, selection is made on an OFF mode selection display 4, then it indicates that the electric power in not ON in the condition thereof.

When a HDD-mode selection display 6 reaches to the position of the reference mark 3 while the user rotates the dial portion 1 into the clockwise direction, the electric power is turned ON and the video camera starts the initialization under the HDD mode for operating the HDD 28 to be the recording portion. Further rotating the dial portion into the clockwise direction, and when a DVD-mode selection display reaches to the position of the reference mark 3, then in the similar manner, the video camera starts the initialization under the DVD mode. However, when the user rotates slides a lock switch 8 from the position shown in FIG. 1 into the direction of an arrow, since the HDD-mode selection display 6 can rotate but until the position of the reference mark 3 in the structure thereof, then the dial portion 1 can be protected from being rotated to the DVD mode, erroneously, in case when the user wishes to use the video camera under the HDD mode. On the other hand, while rotating the dial portion 1 from the condition where the electric power is turned OFF into the anticlockwise direction, when a memory card selection display reaches to the position of the reference mark 3, in the similar manner, the camera starts the initialization under the mode of the memory card 30.

Among a plural number of recording media, the initialization time (i.e., the time-period from when it is in un-recordable condition to when it comes to be recordable) for each of them differs from one another. For example, the initialization time of the HDD 28 is shorter than that of the DVD drive 29, which necessitates an adjustment of power for an optical pickup, etc. Then, the power/mode exchange switch 24 is so arranged that, in the order of selection, the HDD mode comes to the switch position to be selected first when the user makes an operation for turning the power ON, and the switch position to be selected thereafter is the DVD mode. With applying such the structures of the switch, when turning the power ON, it is possible to start the HDD mode with the operation earlier than that for initializing the DVD drive, and for the user who wishes to take a picture earlier, it is possible to bring the camera to be recordable, earlier, by initializing the hard disk; therefore it is possible to reduce a possibility of loosing a chance to take an important scene for the user.

Also, with the digital video camera provided with two (2) pieces of recording portions, such as, the HDD and the DVD drive, for example, expectation can be made that the frequency of using the camera under the HDD mode comes to be large, due to the ways of using, i.e., while recording is made onto the HDD, normally, dubbing is made on necessary pictures or images thereof. Then, it is preferable to arrange the power/mode exchange switch 24, so that it always passes through the HDD mode, first, when operating the power ON.

Also, in case of the DVD drive, in particular, when no DVD disk is inserted therein, it is necessary to insert a DVD disk, and insertion of the DVD disk takes a time, then as a result, the user looses a chance to take an important scene; however, the camera having the built-in HDD also brings about an advantage that the user can record the important scene soon, when she/he starts the camera.

However, in FIG. 1, it is possible to make recording into the memory card when turning the switch 24 in the right-hand direction, while into the HDD or the DVD when turning it in the left-hand direction. This switch may be so arranged that recording be made into the memory card, HDD or the DVD when turning it in the left-hand direction. However, in this instance, the user must rotate the switch by three (3) positions, so as to select the DVD. Also, in case where such distinction is made that the camera is exclusively for use of still pictures when recording them into the memory card, while for use of moving pictures when recording them into the HDD or the DVD, it sometimes causes the undesirable situation that no moving picture is taken irrespective of an intention of the user to photograph the moving picture, if the memory card is erroneously selected although she/he withes to take the moving picture, due to rotating operation of the switch by the user is in short or too much; therefore, it is preferable to make such distinction that it is for the still picture when turning the switch in the right-hand direction while for the moving picture when turning it in the left-hand direction.

Also, in the case where the video camera is connected with external equipment, such as, a personal computer (PC), etc., through an interface (a transmission portion) of the video camera, by means of a USB cable, for example, the video camera appears differently, i.e., as the DVD drive or the HDD, on that external equipment, depending on the mode of the switch 24. When selection is made on the DVD mode (i.e., the position of "7"), the camera sends a signal so that it appear to be the DVD drive on the external equipment. Also, it sends the signal so that it appears to be the HDD on the external equipment, when selection is made on the HDD mode (i.e., the position of "6"). However, herein if data is memorized onto the HDD in the form of UDF (Universal Disk Format), in particular, for the PC, it is impossible to recognize it to be the HDD, but recognizes it to be the DVD drive. Then, for enabling distinction that the camera is connected under the HDD mode but not the DVD mode if the HDD memorizes data in the form of UDF, it is preferable to send the information indicating that it is a hard disk drive (for example, a volume label, or an icon).

(2) Initialization Time of Video Camera

Explanation will be made about the initialization timing of the HDD 28 and the DVD drive 29, by referring to FIG. 3.

FIG. 3, indicating time on the vertical axis, shows times (T0, T1, T2) when the mode is switched (Power OFF, HDD mode, DVD mode) through operation of the power/mode exchange switch 24 by the user. Upper bars (Ts and Th) in FIG. 3 show the case of initializing the HDD when the user moves the power/mode exchange switch 24 from the position of the power OFF to the position for selecting the HDD mode. On the other hand, an lower bar (Td) in FIG. 3 shows the case of initializing the DVD drive when moving the power/mode exchange switch 24 from the position of the power OFF through the position for selecting the HDD mode to the position for selecting the DVD mode. "Ts" indicates a so-called system initialization time for initializing a system of the present video camera, i.e., starting from the power OFF condition, through the time-period when the power supply portion 26 supplies electric power to every portions of the present digital video camera when the election power is turned ON, until the time when the system controller portion 25 starts the operation thereof, thereby to start confirmation of position of the power/mode exchange switch 24. Also, "Th" is the initialization time until when the HDD 28 comes into the recordable condition from the initialization thereof, and "Td" the initialization time of the DVD drive 29. Within the "Th", for example, the hard disk is stabilized in the rotation thereof, and a magnetic head for reading/writing of data from/onto the hard disk moves (seeks) to a writing position. Within the "Td", for example, the DVD is stabilized in the rotation thereof, and an optical head (i.e., an optical pickup) for reading/writing data from/onto the DVD reads out the information of that DVD to adjust an optical output thereof and moves (seeks) to the writing position.

In case when the user operates the power/mode exchange switch 24, in order to record the picture or image from the image pickup portion 21, the present video camera initializes the system thereof when reaching to the time (T1) of rotating the power/mode exchange switch 24 from the position of power OFF to the position for selecting the HDD mode, and after elapsing a time (T1+Ts), the initialization is started on the HDD 28. Thereafter, after elapsing the time (T1+Ts+Th) adding the initialization time for the HDD 28 thereto, it is possible to make recording onto the HDD 28. As was explained in the above, in case where the HDD is earlier than the DVD drive in the initialization time, with arrangement of the HDD mode, being short in the initialization time, at the position to be near side thereto in exchanging operation of the switch from the power OFF, it is possible to select the HDD mode earlier when making an operation of the power ON, and therefore the time until the time when the camera comes to be photographable is short enough, comparing to the case where the time is opposite thereto. Accordingly, since a waiting time can be shorten or reduced until when the camera comes to be photographable after operation of tuning the power ON, for the user, it is possible to reduce the possibility of loosing the chance of taking a picture of the important scene, and thereby improving or increasing the usability thereof.

Also, in case when recording under the DVD mode, firstly the system of the present video camera is initialized when the power/mode exchange switch 24 is shifted from the position of power OFF to the position for selecting the HDD mode. Further, when the power/mode exchange switch 24 is rotated to the position for selecting the DVD mode (T2), the DVD drives 29 starts the initialization. Thereafter, after elapsing the time (T2+Td) adding the initialization time "Td" of that VD drive 29 thereto, recording is possible to the HDD 28. Thus, since the arrangement is made on the switch so that it passes through the position for selecting the HDD mode, for selecting the DVD mode, the power supply is already started and the system controller portion 25 starts the operation thereof, when the switch enters in the position for selecting the HDD mode (T1). Therefore, it takes only the initialization time "Td" of the DVD drive 29, even after moving the power/mode exchange switch 24 to the position for selecting the DVD mode at the time Ts<T2, after using the camera with recording under the HDD mode. Accordingly, the waiting time after when the power/mode exchange switch 24 enters in the position for selecting the DVD mode until when recording is possible to the DVD (=an apparent initialization time under the DVD mode) is only "Td"; therefore, it can be shorten by the time "Ts" comparing to the technology of initializing the system after when selection is made on the DVD mode.

However, FIG. 3 shows the condition where the initialization process is conducted on the HDD 28 even after the camera is changed into the DVD mode at the time (T2), but by interrupting the initialization process of the HDD 28, in the case when the camera is changed into the DVD mode at the time (T2), it is possible to reduce consumption of the electric power. Also, with such the operation that the HDD 28 enters into a waiting mode, being low in the electric power consumption, when the initialization process is completed on the HDD 28 after the camera is changed into the DVD mode at the time (T2), the initialization process of the HDD 28 can be completed, quickly, when the camera is changed into the HDD mode again.

However, in the present embodiment, although the explanation was given on the case where the HDD and the DVD drive are provided, but the present invention should not be restricted to this, it is applicable into an apparatus comprising the recording portions in plural numbers thereof, each having the recording function. For example, the optical disk should not be restricted to the DVD, but it may be other optical disks, such as, a BD (a Blue-ray Disc) or a HD(High Definition)-DVD, etc. Also, the combination of the recording portions should not be restricted only to the HDD and the optical disk, but it may be a combination of the optical disk and a semiconductor memory.

(3) Function of Shutter Button

Upon operation on the apparatus of multi-functions, such as, the video camera according to the present embodiment, having a dubbing function, a function for editing the picture, and a function of photographing the moving picture and the still picture with mounting a plural number of recording media thereon, etc., demand is made on a button having various functions. However, provision of many of those buttons brings about large-sizing of the portable camera. Then, some of the buttons are shared with the plural number of functions, and are controlled to execute different functions depending upon the mode.

For example, the zoom button 34 indicates the zoom-up and -down when the camera is in the recording (i.e., a photographing) mode, but it has a function for indicating an up/down of a sound volume during when it reproduce the moving picture recorded.

In particular, with the present embodiment, detection is made between a full pushdown (i.e., pushing down the button projecting convex-like down to a predetermined position) and a semi or half pushdown (i.e., pushing down the button on the way, but not down to the position of the full pushdown), so that also the plural numbers of functions are shared with the button (for example, the shutter button 32), which can execute different functions depending on the time when being in the semi-pushdown and the time when in the full-pushdown).

Then, when slowly pushdown such the button, two (2) times of pushdowns are detected in total, i.e., one (1) time when it is pushed down to the semi-pushdown position and another one (1) time when it is down to the full-pushdown position. In case when sharing this button with the functions, which are common with the semi-pushdown and the full-pushdown under a certain mode (for example, a select/release button), it causes a problem. For example, if it responds to both the full-pushdown and the semi-pushdown, then detection is made that the select/release function is pushed down two (2) times, then selection is made when it is at the semi-pushdown position and that selection is released when it is at the full-pushdown position. Thus, although the user pushes down the button, with an intention to select the picture, but both the selection and the release are executed, and therefore, selection cannot be made on the picture. Also, when the button is made responsive only to the full-pushdown position, no response can be obtained unless pushing down the button deeply; therefore, it brings about inferior operability, on the other hand when it is made responsive only to the semi-pushdown, then no response can be obtained unless pushing down the button slowly; therefore, it also brings about inferior operability.

Then, according to the present embodiment, control is made as is shown in FIG. 9. This FIG. 9 shows the functions and the controls of the shutter button depending on the mode thereof.

"Mode Type" indicates a kind of the mode of the video camera. Under any one of the conditions where the positions 5, 6 and 7 shown in FIG. 1 are selected, it is assumed to be in the recording mode (or, assuming that the camera is in a still picture photographing mode when only the memory card 5 is selected, and it is operable under the recording mode during this time-period). In this recording mode, when detection is made on the pushdown of the reproduce button, which is located at the central portion of the cursor button 32 shown in FIG. 8, the camera is switched into the reproduction mode for reproducing the pictures recorded. Also, when detection is made on the pushdown of the navigation button 38 in FIG. 8 under the recording mode, then the camera is switched into the navigation mode.

Under "Record Mode", when pushing down the shutter button to the semi-pushdown position, focus onto an object to be photographed is locked due to an auto-focus function. When pushing down the shutter button to the full-pushdown position, it is possible to photograph a still picture.

Under "Reproduce Mode", when the shutter button 32 is pushed down to the semi-pushdown position and also when it is pushed down to the full-pushdown position, both cases are assumed to an indication to execute a still picture capture function for storing the still picture separately from the pictures under reproduction. Herein, since there is a problem of pushing down the shutter button two (2) times for the shutter button 32, as was mentioned previously, determination is made on whether the semi-pushdown is detected or not before, when the shutter button 32 is pushed down to the full-pushdown position. If the semi-pushdown is detected, then determination is made on whether that semi-pushdown is released or not, through releasing of the pushdown due to removal of the finger put on the shutter button 32, etc. In case when no semi-pushdown is detected, or when detected but it is released, the still picture capture function is made effective.

Under "Navigation Mode", both cases, when the shutter button 32 is pushed down to the semi-pushdown position and also when down to the full-pushdown position, are assumed to be an indication to execute the select/release function, to select an arbitrary picture among the pleural number of pictures recorded, and to release that selection of the picture selected. In case when the shutter button is pushed down to the full-pushdown position, determination is made on whether the semi-pushdown is detected or not before. If the semi-pushdown is detected, then determination is made on whether that semi-pushdown is released or not, through releasing of the pushdown due to removal of the finger put on the shutter button 32, etc. In case when no semi-pushdown is detected, or when detected but it is released, the full-pushdown is made effective, and then executes the select/release function.

Though mentioned that determination is made on whether that semi-pushdown is released or not, in the embodiment mentioned above, but in the place thereof, it is also possible to make determination on whether the semi-pushdown is continued or not.

Also, when the full-pushdown is ineffective, it is assumed to be invalid, and the no execution is made on the functions (i.e., neglect the full-pushdown).

Controlling in this manner enables to use the buttons of the video camera, effectively.

Embodiment 2

Explanation will be made on an embodiment 2, wherein it differs from the embodiment 1 in a shape of the power/mode exchange switch 24.

Figure 5:
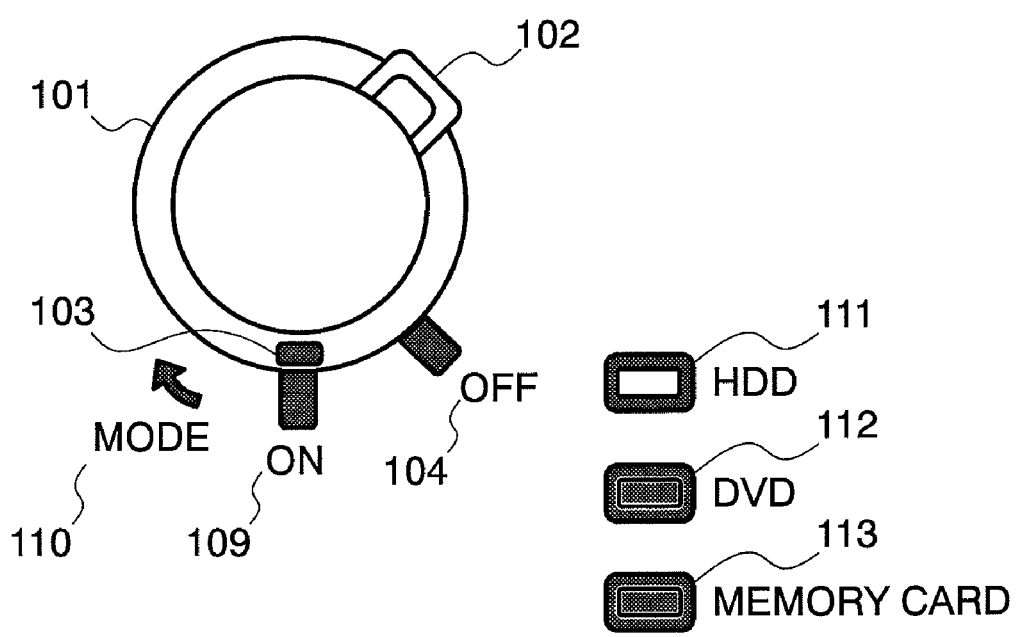
FIG. 5 shows an example of the outlook of a power/mode exchange switch of an embodiment 2.

FIG. 5 is an outlook view for showing an example of the shape of a power/mode exchange switch 24 according to the second embodiment. Differing from that shown in FIG. 1, a reference mark 103 indicating the position of the switch is printed on a dial portion 101, when the user rotates the dial portion while holding a projection portion 102, the reference mark mentioned above also rotates accompanying with that. Also, NO/OFF of the electric power can be selected by rotating the dial portion 101, so as to move the above-mentioned reference mark 103 to a portion of an IN-mode select display 109 or an OUT-mode select display 104. However, for switching over the HDD mode, the DVD mode and the memory card mode, switching is made, sequentially, while pushing the dial portion 101 from the IN-mode select display, further down to the position of "Mode Arrow Mark", in the clockwise direction. However, the dial is so structured that the reference mark 103 mentioned above turns back to the position of the IN-mode select display 109 when weakening a pushdown power or releasing a finger, with an aid of force of a spring. In this manner, since it is impossible for the user to see which one of the modes is selected, with such the power/mode exchange switch, LED lamps are attached with, respectively, for indicative the modes thereof.

In FIG. 5, from a top, there are aligned an HDD mode indicator 111, a DVD mode indicator 112, and a memory card indicator 113, in that order. Herein, in the structures, when moving the dial portion 101 from the position of the OUT-mode select display 104 to the position of the IN-mode select display 109, first it comes in the HDD mode, and then the HDD mode indicator 111 lights. Thereafter, when pushing down the dial portion, it is changed, sequentially, i.e., "DVD mode"→"memory card"→"HDD card"→"DVD mode".

Figure 6:
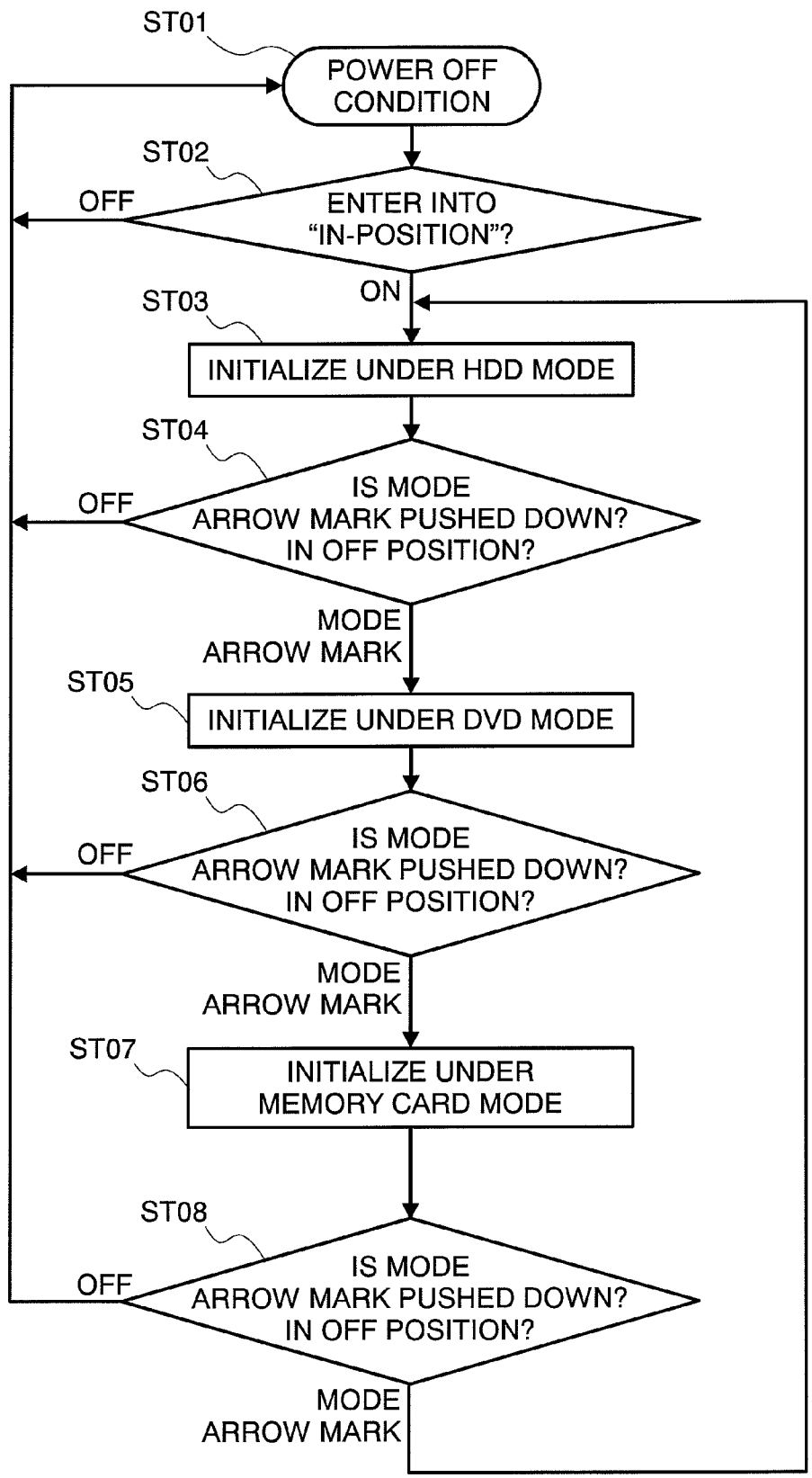
FIG. 6 shows an example of transition of conditions of the digital video camera, accompanying with operations of the power/mode exchange switch of the embodiment 2.

FIG. 6 shows a flowchart for showing conditional transition of the digital video camera, accompanying with operation of the power/mode exchange switch, in the embodiment 2. Explanation will be made about the operations made by the operator and the flow of processes of operations of the digital video camera from the condition of the power OFF.

Under the condition of the power OFF, i.e., when the reference mark 103 is positioned at the OUT-mode select display 104 (ST01), and when detection is made that the user moves the dial portion 101 into the clockwise direction, to enter into the IN-mode select display 109 (ST02), then electric power is supplied from the power supply portion 26 to every parts, and therefore the system controller portion 25 stars the operation, and thereby initializing the camera under the HDD mode (ST03). Within this digital camera, similar to that of the embodiment 1, since the initialization time of the HDD is shorter than that of the DVD drive, the system is so constructed that the HDD mode will be selected first. Also, it is constructed that the memory card is selected at the last, however since the initialization time of the memory card is shorter than that of the HDD, therefore it is possible to select the memory card first.

When detecting the dial portion 101 is moved into the clockwise direction and is pushed down into "Mode Arrow Mark" 110 (i.e., "Mode Arrow" in ST04), the camera is initialized under the DVD mode, while stopping the initialization of the HDD (ST05). Further, when detecting that it is pushed down to the "Mode Arrow Mark" 110 (i.e., "Mode Arrow" in ST06), the camera is initialized under the memory card mode, while stopping the initialization of the DVD drive (ST07). Further, when detecting the dial portion 101 is pushed down into "Mode Arrow Mark" 110 (i.e., "Mode Arrow" in ST08), the process is turned back to the step ST03, thereby initializing the camera under the HDD mode again, while stopping the initialization of the memory card. However, in the steps ST02, 04, 06 and 08, when moving the reference mark 103 mentioned above to the position of the OUT-mode select display 104, then the process turns back to the step ST01, thereby falling into the condition of power OFF.

Embodiment 3

Explanation will be made on an embodiment 3, wherein it differs from the embodiment 1 in timing of starting the initialization of the DVD.

Figure 7:
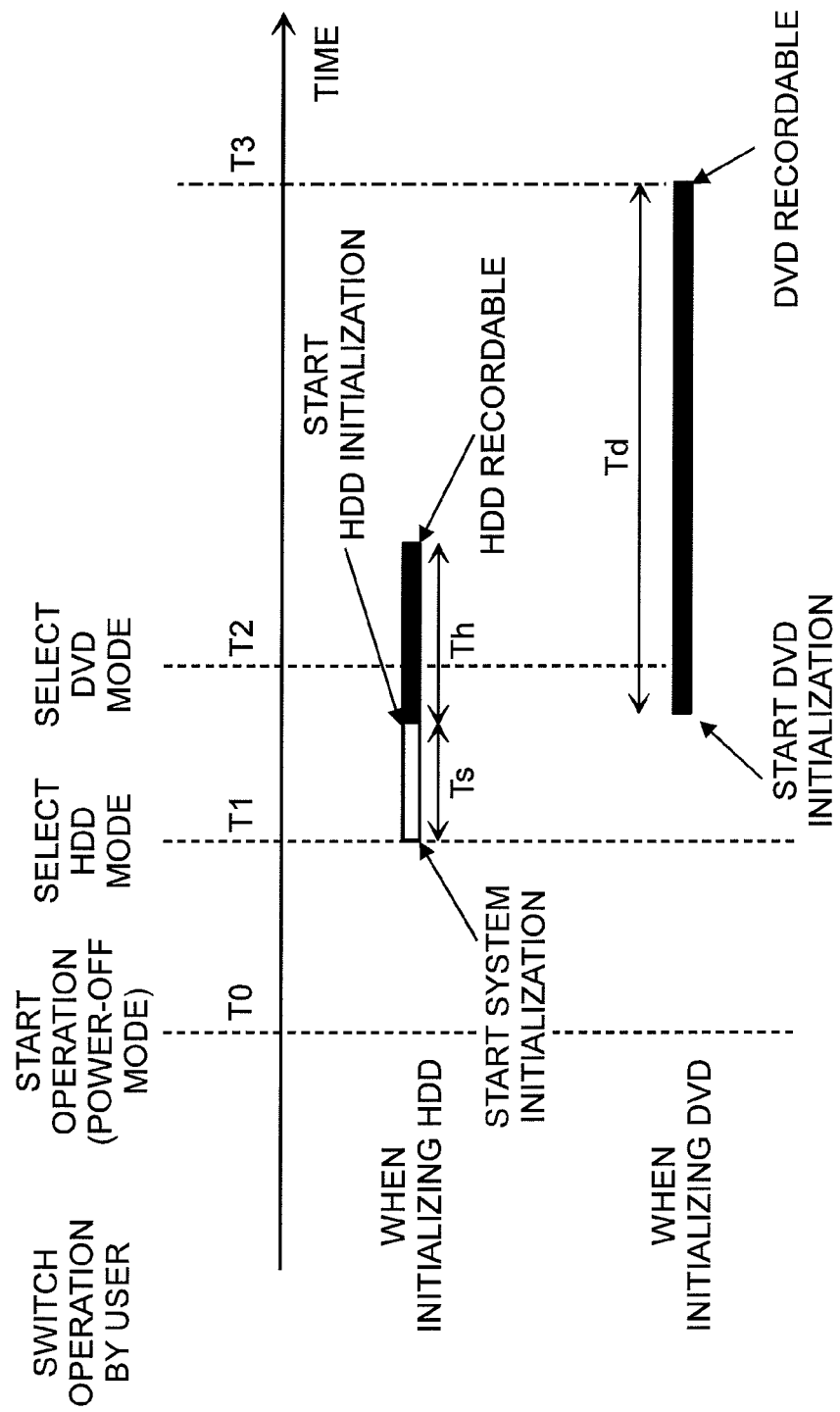
FIG. 7 shows an example of timing for explaining the initializing time of an embodiment 3.

FIG. 7 is a timing view for explaining about the initialization time in the embodiment 3.

When initializing the DVD, the system of the present video camera starts the initialization at the time when the power/mode exchange switch 24 is shifted from the position of power OFF to the position for selecting the HDD mode, and further after elapsing the time (T1+Ts), initialization is started on the HDD 28 and the DVD drive 29. Thereafter, after elapsing the time (T1+Ts+Td) adding the initialization time of the DVD drive 29 thereto, the DVD drive 29 comes to be recordable. On the other hand, the user turns the power/mode exchange switch 24 further, for turning the it to the DVD position, and after the time (T2), the camera comes into the DVD mode.

In this manner, since the initialization of the DVD drive 29 is started prior to the time (T2), the waiting time after the user makes operation into the DVD position is shorten or reduced, comparing to the case when starting the initialization of the DVD drive 29 at the time T2.

Although the initialization process is conducted on the HDD 28 after changing the camera into the DVD mode at the time (T2) in the embodiment mentioned above, however the initialization process of the HDD 28 may be ended when it is changed into the DVD mode. Or, it is also possible that the HDD enters into the waiting mode being low in consumption of the electric power, after changing into the DVD mode at the time (T2), when the initialization process of the HDD 28 is completed.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An imaging apparatus, comprising:
a first recording module with a first recording medium, which has a first initialization time from initialization to coming into a recordable condition;
a second recording module adapted to handle a second recording medium, which has a second initialization time from initialization to coming into a recordable condition, being longer than the first initialization time;
a mode switching module, which is configured to switch over to a power OFF mode, a mode for recording into said first recording module, and a mode for recording into said second recording module, wherein
said mode switching module, which in switching over between said power OFF mode and said mode for recording into said second recording module, only switching: from said power OFF mode, to said mode for recording into said first recording module next after said power OFF mode, and to said mode for recording into said second recording module next after said mode for recording into said first recording module, and from said mode for recording into said second recording module, to said mode for recording into said first recording module next after said mode for recording into said second recording module, and to said power OFF mode next after said mode for recording into said first recording module.

2. The imaging apparatus, as described in the claim 1, wherein said mode switching module is made of a rotation-type switch, and it selects from said power OFF mode to said mode for recording into said first recording module, and to said mode for recording into said second recording module, in an order of rotation thereof.

3. The imaging apparatus, as described in the claim 1, wherein
said first recording module is a hard disk recording apparatus; and
said second recording module is an optical disk recording apparatus.

4. The imaging apparatus, as described in the claim 1, further comprising:
a photographing module, which is configured to photograph a picture, wherein
said first recording module and said second recording module record the picture photographed by said photographing module.

5. The imaging apparatus, as described in the claim 1, wherein said first recording module and said second recording module are initialized when the recording mode is set to said first recording module.

6. The imaging apparatus, as described in the claim 1, wherein
said initialization is conducted when the mode is exchanged by means of said mode switching module switching from said power OFF mode to said mode for recording into said first recording module, or to said mode for recording into said second recording module, and
said recordable condition is when rotation of a recording medium of said first recording module or said second recording module is stabilized and position and output of a head for recording onto said recording medium are stabilized.

7. An imaging apparatus, comprising:
a first recording module with a first recording medium, which is used for a normal recording;
a second recording module adapted to handle a second recording medium, which is used for dubbing from said first recording module; and
a mode switching module, which is configured to switch over to a power OFF mode, a mode for recording into said first recording module, and a mode for recording into said second recording module, wherein
said mode switching module, which switch in switching over between said power OFF mode and said mode for recording into said second recording module, only switching: from said power OFF mode, to said mode for recording into said first recording module next after said power OFF mode, and to said mode for recording into said second recording module next after said mode for recording into said first recording module, and from said mode for recording into said second recording module, to said mode for recording into said first recording module next after said mode for recording into said second recording module, and to said power OFF mode next after said mode for recording into said first recording module.

8. An imaging apparatus, comprising:
a first recording module with a first recording medium, which is built into the imaging apparatus;
a second recording module adapted to handle a second recording medium, which is configured to record into a removable recording media; and
a mode switching module, which is configured to switch over to a power OFF mode, a mode for recording into said first recording module, and a mode for recording into said second recording module, wherein
said mode switching module, which in switching over between said power OFF mode and said mode for recording into said second recording module, only switching: from said power OFF mode, to said mode for recording into said first recording module next after said power OFF mode, and to said mode for recording into said second recording module next after said mode for recording into said first recording module, and from said mode for recording into said second recording module, to said mode for recording into said first recording module next after said mode for recording into said second recording module, and to said power OFF mode next after said mode for recording into said first recording module.

9. The imaging apparatus, as described in the claim 1, wherein said mode for recording into said first recording module is passed through before said mode for recording into said second recording module, in switching over to said mode for recording into said second recording module.

10. The imaging apparatus, as described in the claim 7, wherein said mode for recording into said first recording module is passed through before said mode for recording into said second recording module, in switching over to said mode for recording into said second recording module.

11. The imaging apparatus, as described in the claim 8, wherein said mode for recording into said first recording module is passed through before said mode for recording into said second recording module, in switching over to said mode for recording into said second recording module.

* * * * *